(12) United States Patent  
Nower et al.

(10) Patent No.: US 9,885,237 B2  
(45) Date of Patent: Feb. 6, 2018

(54) APPARATUS AND METHOD FOR MONITORING HEALTH OF ARTICULATING MACHINERY

(71) Applicant: Emerson Electric (US) Holding Corporation (Chile) Limitada, Santiago (CL)

(72) Inventors: Daniel L. Nower, Knoxville, TN (US); Anthony J. Burnett, Knoxville, TN (US); Mark O. Pendleton, Knoxville, TN (US)

(73) Assignee: Emerson Electric (US) Holding Corporation (Chile) Limitada (CL)

( * ) Notice: Subject to any disclaimer, the term of this patent is extended or adjusted under 35 U.S.C. 154(b) by 307 days.

(21) Appl. No.: 14/494,028

(22) Filed: Sep. 23, 2014

(65) Prior Publication Data

US 2015/0088372 A1    Mar. 26, 2015

Related U.S. Application Data

(60) Provisional application No. 61/881,143, filed on Sep. 23, 2013.

(51) Int. Cl.
*G01M 99/00* (2011.01)
*E02F 9/26* (2006.01)
(Continued)

(52) U.S. Cl.
CPC .............. *E21C 35/00* (2013.01); *E02F 9/267* (2013.01); *G01M 7/00* (2013.01)

(58) Field of Classification Search
CPC .............. G01M 7/00; E21C 35/00; E02F 9/26
See application file for complete search history.

(56) References Cited

U.S. PATENT DOCUMENTS

| 2009/0099886 A1* | 4/2009 | Greiner .............. G01G 23/3735 |
| | | 705/7.38 |
| 2009/0198422 A1* | 8/2009 | Vik ........................ G07C 5/008 |
| | | 701/50 |

(Continued)

*Primary Examiner* — Mussa A Shaawat
(74) *Attorney, Agent, or Firm* — Luedeka Neely Group, P.C.

(57) ABSTRACT

An apparatus for acquiring repeatable and trendable performance data for monitoring the health of an articulating machine includes sensors, a programmable logic controller, a machinery monitoring system, and a display device. The sensors collect performance data as the machine performs prescribed motions. The programmable logic controller includes memory for storing motion predicate values that indicate motion conditions to be achieved as predicates to analysis of performance data as the machine performs the prescribed motions. A processor in the programmable logic controller compares the performance data to the motion predicate values to determine whether the motion conditions are being achieved as the machine performs the particular prescribed motion. A processor in the machinery monitoring system calculates analysis parameter values that indicate the health of the machine. These calculations are made using performance data collected while the motion conditions are being achieved. The display device prompts an operator to operate the machine to perform each of the prescribed motions until data has been collected for the prescribed motions.

26 Claims, 6 Drawing Sheets

(51) Int. Cl.
*E21C 35/00* (2006.01)
*G01M 7/00* (2006.01)

(56) References Cited

U.S. PATENT DOCUMENTS

| | | | |
|---|---|---|---|
| 2009/0265583 A1* | 10/2009 | Bouse | G05B 19/0425 714/37 |
| 2012/0053778 A1* | 3/2012 | Colvin | G07C 5/008 701/29.4 |
| 2012/0215378 A1* | 8/2012 | Sprock | E02F 9/205 701/2 |
| 2012/0215379 A1* | 8/2012 | Sprock | E02F 9/2054 701/2 |
| 2013/0184927 A1 | 7/2013 | Daniel et al. | |
| 2014/0032061 A1* | 1/2014 | Wulf | F16H 63/42 701/51 |

* cited by examiner

APPARATUS AND METHOD FOR MONITORING HEALTH OF ARTICULATING MACHINERY

RELATED APPLICATIONS

This application claims priority to provisional patent application Ser. No. 61/881,143 filed Sep. 23, 2013, titled "Method and Apparatus for Monitoring Health of Articulating Machinery," the entire contents of which are incorporated herein by reference.

FIELD

This invention relates to the field of integrated vibration analysis and structural analysis of cyclic and articulating machinery.

BACKGROUND

Traditional vibration analysis of machinery typically requires measurements to be made under constant operating conditions. For example, to achieve repeatability and trendability, data collection is usually done while the machinery is operating at steady state and constant speed, with unchanging load, without acceleration or deceleration, and with a single direction of movement for each component of the machinery.

However, some types of articulating machinery, such as shovels and draglines used in heavy excavation and mining, do not operate under steady-state conditions. Instead, they experience frequent changes in direction with variable speed, variable acceleration/deceleration, and variable loading. Movements such as hoist up, hoist down, crowd out, crowd in, swing left and swing right, all require changing and reversing direction, speed, acceleration, and deceleration.

Within some of these articulating machines are constant-speed and constant-load rotating assets, such as cooling fans and hydraulic pumps. Although these support components are typically not as critical as the articulating components, if the support components fail, the critical assets may overheat or have no fluid pressure to drive the articulating components, thereby shutting down operation of the articulating machine.

The widely-varying loads experienced by shovels and draglines and other types of heavy articulating machinery can stress their structures to the point of fatigue and eventual failure. The complex signatures attributable to variable power, variable load, changing speeds, and many other signature-producing actions associated with articulating machinery make it extremely challenging to achieve repeatable, trendable and meaningful vibration measurements for use in monitoring the condition of articulating and reciprocating machinery.

What is needed, therefore, is a system for achieving repeatability and trendability in vibration data collected from articulating and reciprocating machinery.

SUMMARY

The above and other needs are met by a system that uses triggered data collection, standardized analysis, and dataset-based data collection with time-stamped application data rather than not-time-based data collection.

Some embodiments interpret a reproducible portion of an articulating or cyclic duty cycle of operation, identify and select at least brief intervals during which data collection is reasonably reproducible and meaningful, and establish standard protocols for collecting information-containing sensory signals during such pre-selected intervals until sufficient data has been collected to support trendable analysis.

Some embodiments implement a method that uses a first part of a knowledge base about a mechanical system or a structural system, and deterministically interprets this knowledge base to determine paths of travel and loading conditions for bearing, gear, motor rotor, and other load bearing mechanisms within a complex system. A preferred embodiment of the knowledge base is based on experience gained regarding the structure and locations of the mechanical mechanisms mentioned above. The path of vibration transmission is defined to determine the best monitoring point locations at which vibration sensors should be placed to acquire the most descriptive vibration data. Generally, the best transmission paths are through solids that contain low dampening properties, such as metal structures. Materials having high dampening properties generally will not allow descriptive vibration data to pass through to monitoring points.

In some embodiments, the knowledge base references specific mechanical components that make up the monitored machine, such as gearboxes and rolling element bearings. These represent the majority of the components to be monitored, and their structural design will determine the transmission path, thus determining the optimal locations for data collection. This knowledge base also includes the duty cycle and sequence for the operation of the asset. Data collection is preferably optimized to ensure that trendable and repeatable data is collected within the available windows of operation.

A second part of a base of knowledge about the structural or mechanical system is used to define a duty cycle sequence that may be exercised under relatively repeatable circumstances in a manner that applies sufficient movement and load to the system, such that normal and fault-indicative characteristics of interest might be revealed using a condition monitoring system. The method identifies data collection measurement intervals, and identifies points in a timeline, events in a work process, or steps in a work schedule at which data should be collected under reasonably repeatable loads, speeds and directions. The content of this base of this knowledge is determined based on which critical mechanical system (i.e., the hoist, crowd, or swing) is being monitored, the rotational speeds of all components in the associated mechanical system, and the frequencies that would be generated by potential machine faults. The data collection time is established from the frequency range and time resolution needed to capture the mechanical faults. The data collection times and system cycle times are then correlated. In order to correlate these times, some strategic sacrifices may be needed regarding resolution or frequency to capture the data in the available system cycle time. Finally, the method performs measurements that are likely to detect, quantify, and reveal trendable and repeatable information about the health of system components.

Embodiments of the invention described herein distinguish normal from abnormal operation in articulating machinery, and quantitatively and qualitatively assess detection and progression of structural and machinery faults from incipient to a near-inoperable state or a near-catastrophic state. Some embodiments provide predictive information indicative of faults or operational states that are likely to get progressively worse, such as a fatigue condition, a corrosion condition, or a severe sliding condition. Some embodiments provide proactive information regarding design and operational stimuli that may translate into incipient and worse machine component damage, such as an inadequate lubrication condition, a resonant condition, or a misalignment condition. Some embodiments yield information indicating a condition having potential to affect process or production, such as a stick-slip condition, a temperature condition, a speed condition, or a displacement condition near a limit or outside a tolerance deemed acceptable for a process.

Embodiments described herein detect and trend machinery faults including but not limited to the following:
 a. rolling element bearing faults including inner race defect, outer race defect, roller element defect, cage defect, and race slipping;
 b. a planetary gear defect, a rack-and-pinion gear defect, or other defect including crack formation and propagation, broken teeth, tooth fatigue, abrasion or gear misalignment;
 c. shaft coupling misalignment;
 d. a mechanical imbalance for a rotor;
 e. a phase imbalance for a motor rotor or stator;
 f. a phase imbalance for a generator rotor or stator;
 g. a motor rotor or motor stator problem, such as a broken rotor bar, an eccentricity, or other electrical or mechanical fault listed above;
 h. a mechanical looseness allowing excessive play or movement;
 i. a soft foot or other foundation problem; and
 j. blade or vane defects in hydraulic or other type of pumps.

Preferred embodiments include programmed logic that assists an operator in setting up an articulating machine monitoring system. Such programmed logic prompts an operator and mathematically calculates incremental improvements between multiple selection choices intended to provide the following:
 a. data collection under relatively repeatable circumstances;
 b. application of sufficient movement and load to the system so that normal and faulty characteristics of interest might be revealed using a condition monitoring system;
 c. designation of intervals or points in a timeline, events in a work process, or steps in a work schedule at or during which data may be collected;
 d. collection of data under reasonable and repeatable load, speed, and direction;
 e. performance of measurements likely to detect, quantify, and reveal trendable and repeatable information about the health of components;
 f. acquisition of data at anytime from constant speed and constant load support assets, such as using a wireless transmitter;
 g. acquisition of structural condition data during all data collection intervals mentioned above.

Embodiments described herein provide an apparatus for acquiring repeatable and trendable performance data for monitoring the health of an articulating machine. Some embodiments include sensors, a programmable logic controller, and a machinery monitoring system. The sensors, which are attached to components of the machine, collect performance data as the machine performs prescribed motions. The programmable logic controller is configured to receive the performance data from the sensors. The programmable logic controller includes memory for storing motion predicate values, each of which indicate a motion condition to be achieved as a predicate to analysis of performance data as the machine performs the prescribed motions. The programmable logic controller also includes a processor for determining, based on comparing the performance data to the motion predicate values, whether one or more motion conditions are being achieved as the machine performs the particular prescribed motion. The machinery monitoring system has a processor that calculates one or more analysis parameter values that are indicative of the health of the machine. These calculations are made using performance data collected while the one or more motion conditions are being achieved.

In some embodiments, a display device prompts an operator to operate the machine to perform each of the prescribed motions until data has been collected for the prescribed motions.

In some embodiments, the memory of the programmable logic controller stores a speed predicate value and a direction predicate value for one or more of the prescribed motions. The display device of these embodiments prompts the operator to move a component of the machine in a particular direction and at or above a particular speed. The processor of the programmable logic controller is programmed to determine that the component of the machine is moving in a direction indicated by the direction predicate value for the particular prescribed motion and at or above a speed indicated by the speed predicate value for the particular prescribed motion. The processor of the machinery monitoring system calculates the one or more analysis parameter values using performance data collected while the component of the machine is moving in the direction indicated by the direction predicate value and at or above the speed indicated by the speed predicate value.

In some embodiments, the memory of the programmable logic controller stores a motor current predicate value for one or more of the prescribed motions. The processor of the programmable logic controller is programmed to determine that a motor current level is at or above a level indicated by the motor current predicate value for the particular prescribed motion. The processor of the machinery monitoring system calculates the one or more analysis parameter values using performance data collected while the component of the machine is moving in the direction indicated by the direction predicate value and at or above the speed indicated by the speed predicate value and at or above the motor current level indicated by the motor current predicate value.

In some embodiments, the apparatus acquires performance data for monitoring the health of a mining shovel having a bucket. In these embodiments, the memory of the programmable logic controller stores one or more speed predicate values and one or more direction predicate values for one or more prescribed motions of the bucket. These prescribed motions include one or more of a swing bucket left motion, a swing bucket right motion, a crowd bucket in motion, a crowd bucket out motion, a hoist bucket up motion, and a hoist bucket down motion. The display device of these embodiments prompts the operator to swing the bucket left, swing the bucket right, crowd the bucket in, crowd the bucket out, hoist the bucket up, or hoist the bucket down.

In some embodiments, the sensors or the programmable logic controller insert timestamp information into the performance data. The processor of the programmable logic controller is programmed to determine, based on the timestamp information, time durations of one or more data segments during which the one or more motion conditions are being achieved. The processor of the programmable logic controller is also programmed to determine whether a sum of the time durations of the one or more data segments is greater than or equal to a desired total time duration for performance data collection for the particular prescribed motion. The processor of the machinery monitoring system calculates the one or more analysis parameter values if the sum of the time durations of the one or more data segments is greater than or equal to the desired total time duration for performance data collection for the particular prescribed motion.

In some embodiments, the display device displays to the operator an indication of the progress of completion of data collection for the particular prescribed motion based on comparison of the desired total time duration to the sum of the time durations of the one or more data segments.

In some embodiments, the sensors include vibration sensors, current sensors, strain sensors, temperature sensors and/or pressure sensors.

In some embodiments, the processor of the machinery monitoring system calculates one or more analysis parameter values that comprise one or more scalar values, vectors, or array sets.

In another aspect, embodiments described herein provide a method for semi-automatically acquiring repeatable and trendable performance data for monitoring the health of an articulating machine. In a preferred embodiment, the method includes the following steps:
  (a) storing in memory one or more motion predicate values, each indicating a motion condition to be achieved as a predicate to analysis of performance data as the machine performs one or more prescribed motions;
  (b) collecting performance data from sensors attached to components of the machine as the machine is operated to perform work;
  (c) determining whether one or more motion conditions are being achieved for a particular one of the one or more prescribed motions based on comparing the performance data to the one or more motion predicate values;
  (d) calculating one or more analysis parameter values that are indicative of the health of the machine using performance data collected while the one or more motion conditions are being achieved for the particular prescribed motion; and
  (e) repeating one or more of steps (b) through (d) until analysis parameter values have been calculated for the one or more prescribed motions.

In some embodiments, the method includes prompting an operator to operate the machine to perform a particular one of the one or more prescribed motions, and
  step (c) includes determining whether one or more motion conditions are being achieved for the particular prescribed motion prompted for the operator; and
  step (e) includes repeating the prompting of the operator and steps (b) through (d) until analysis parameter values have been calculated for the one or more prescribed motions.

In some embodiments:
  step (a) includes storing a speed predicate value and a direction predicate value for the one or more prescribed motions;
  step (c) includes determining that the component of the machine is moving in a direction indicated by the direction predicate value for the particular prescribed motion and at or above a speed indicated by the speed predicate value for the particular prescribed motion; and
  step (d) includes using performance data collected while the component of the machine is moving in the direction indicated by the direction predicate value and at or above the speed indicated by the speed predicate value to calculate the one or more analysis parameter values.

In some embodiments:
  step (a) includes storing a motor current predicate value for the one or more prescribed motions;
  step (c) includes determining that a motor current level is at or above a level indicated by the motor current predicate value; and
  step (d) includes using performance data collected while the component of the machine is moving in the direction indicated by the direction predicate value and at or above the speed indicated by the speed predicate value and at or above the motor current level indicated by the motor current predicate value to calculate the one or more analysis parameter values.

In an embodiment wherein the articulating machine is a mining shovel having a bucket, step (a) includes storing one or more speed predicate values and one or more direction predicate values for prescribed bucket motions including one or more of a swing bucket left motion, a swing bucket right motion, a crowd bucket in motion, a crowd bucket out motion, a hoist bucket up motion, and a hoist bucket down motion.

In some embodiments:
  step (b) includes inserting timestamp information into the performance data;
  step (c) includes determining time durations of one or more data segments during which the one or more motion conditions are being achieved based on the timestamp information;
  step (d) includes determining whether a sum of the time durations of the one or more data segments is greater than or equal to a desired total time duration for performance data collection for the particular prescribed motion; and
  step (e) includes repeating steps (b) through (d) until the sum of the time durations of the one or more data segments is greater than or equal to the desired total time duration for performance data collection for the particular prescribed motion.

Some embodiments include displaying to an operator an indication of the progress of data collection for the particular prescribed motion based on comparison of the desired total time duration to the sum of the time durations of the one or more data segments.

In some embodiments, step (b) includes collecting performance data from vibration sensors, current sensors, strain sensors, temperature sensors and/or pressure sensors.

In some embodiments, step (d) includes calculating one or more analysis parameter values that comprise one or more scalar values, vectors, or array sets.

In another aspect, embodiments described herein provide a method for automatically acquiring repeatable and trendable performance data for monitoring the health of an articulating machine that performs one or more prescribed motions while performing work. In one preferred embodiment, the method includes the following steps:
  (a) collecting performance data from sensors attached to components of the machine as the machine is operated to perform work;
  (b) determining, based on the performance data, that the machine is performing a prescribed motion that repeats during operation of the machine;

(c) selecting segments of the performance data that were collected while the machine was performing the prescribed motion that repeats during operation of the machine;

(d) determining that a sufficient number of segments of the performance data have been selected to calculate one or more analysis parameter values that are indicative of the health of the machine;

(e) calculating the one or more analysis parameter values when a sufficient number of segments have been selected; and (f) repeating one or more of steps (a) through (e) until analysis parameter values have been calculated for the one or more prescribed motions.

BRIEF DESCRIPTION OF THE DRAWINGS

Various embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
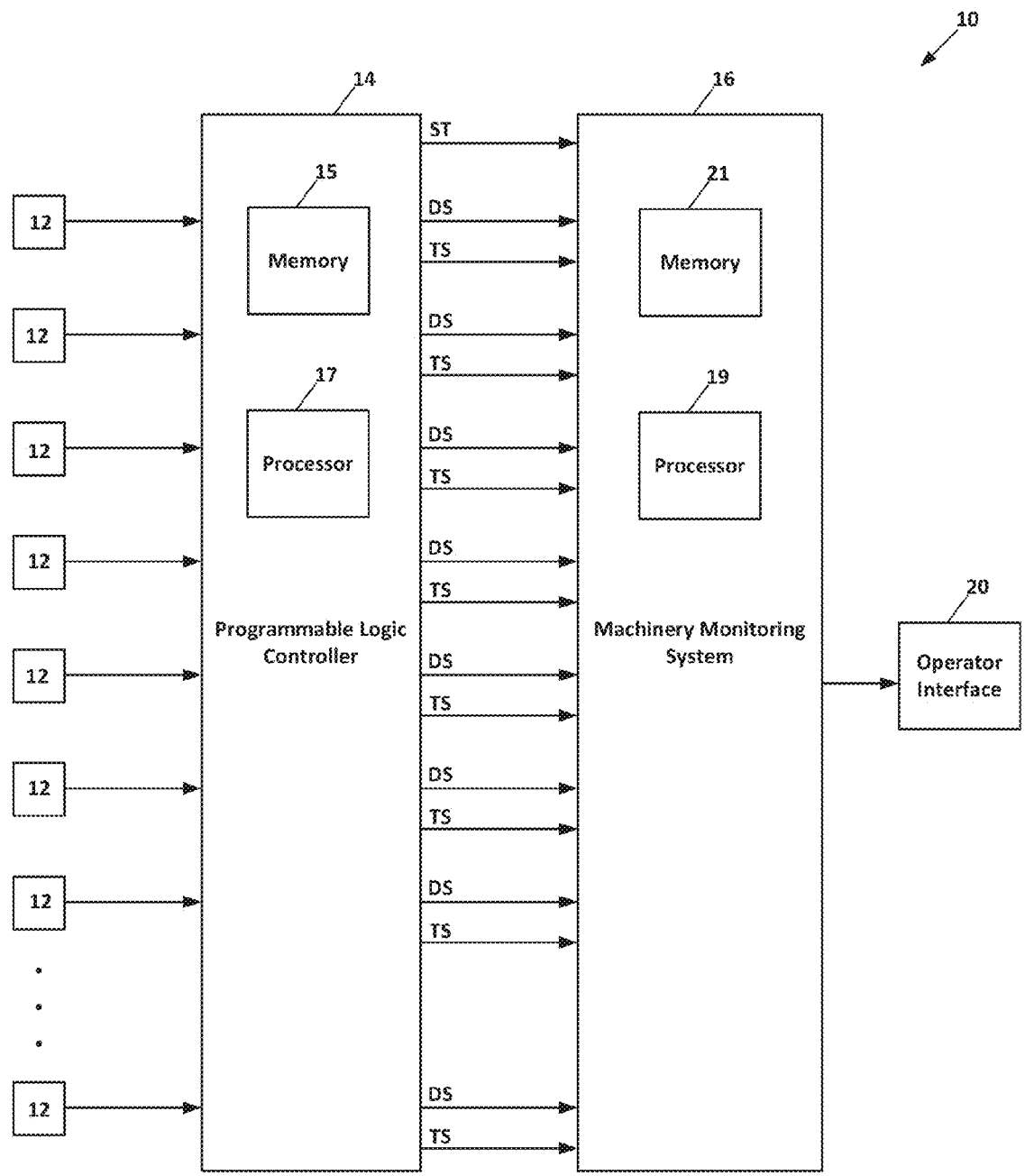
FIG. 1 depicts a functional block diagram of an apparatus for monitoring the health of articulating machinery according to a preferred embodiment.
Figure 2:
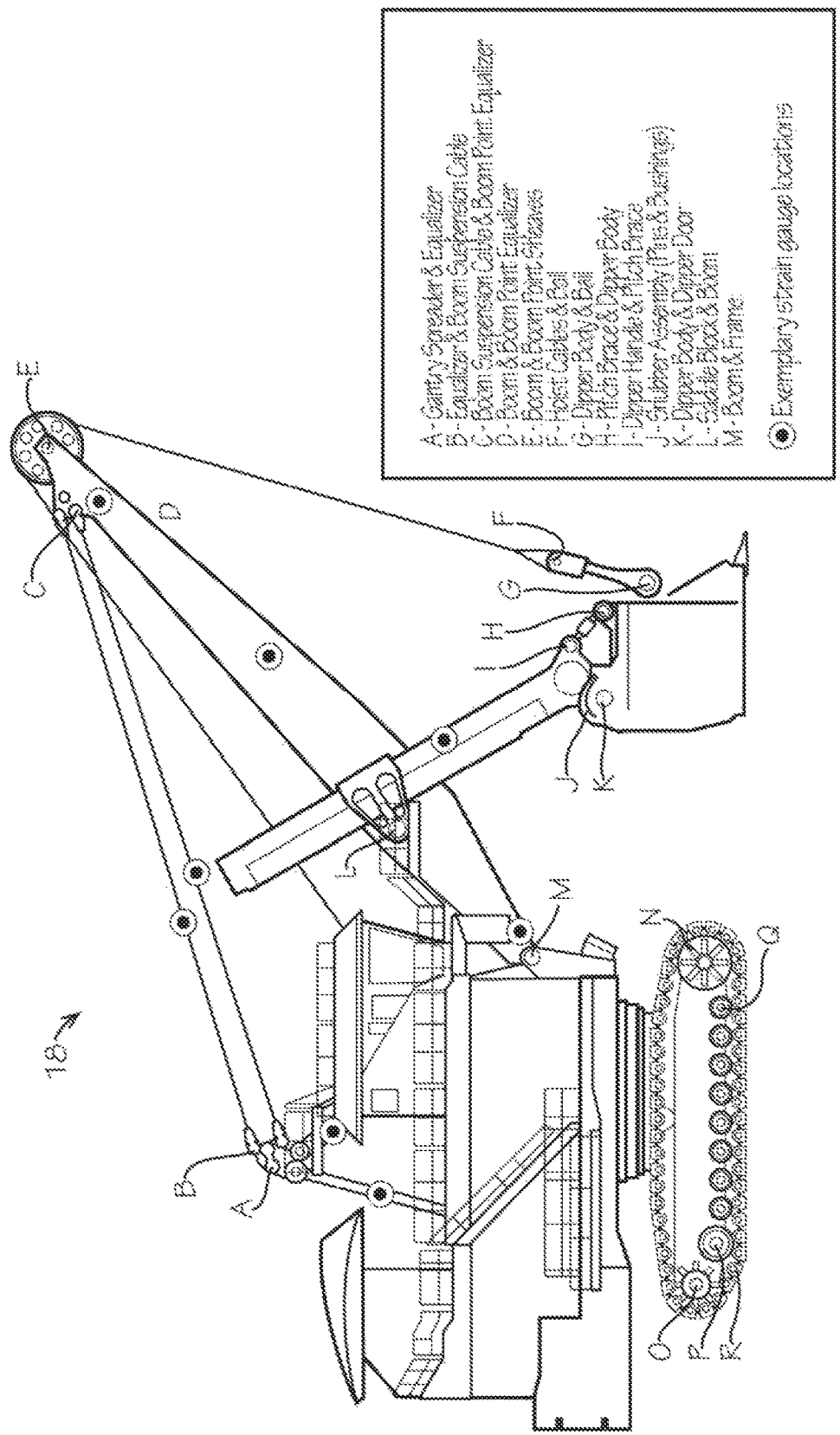
FIG. 2 depicts an exemplary mining shovel with measurement points indicated.
Figure 4:
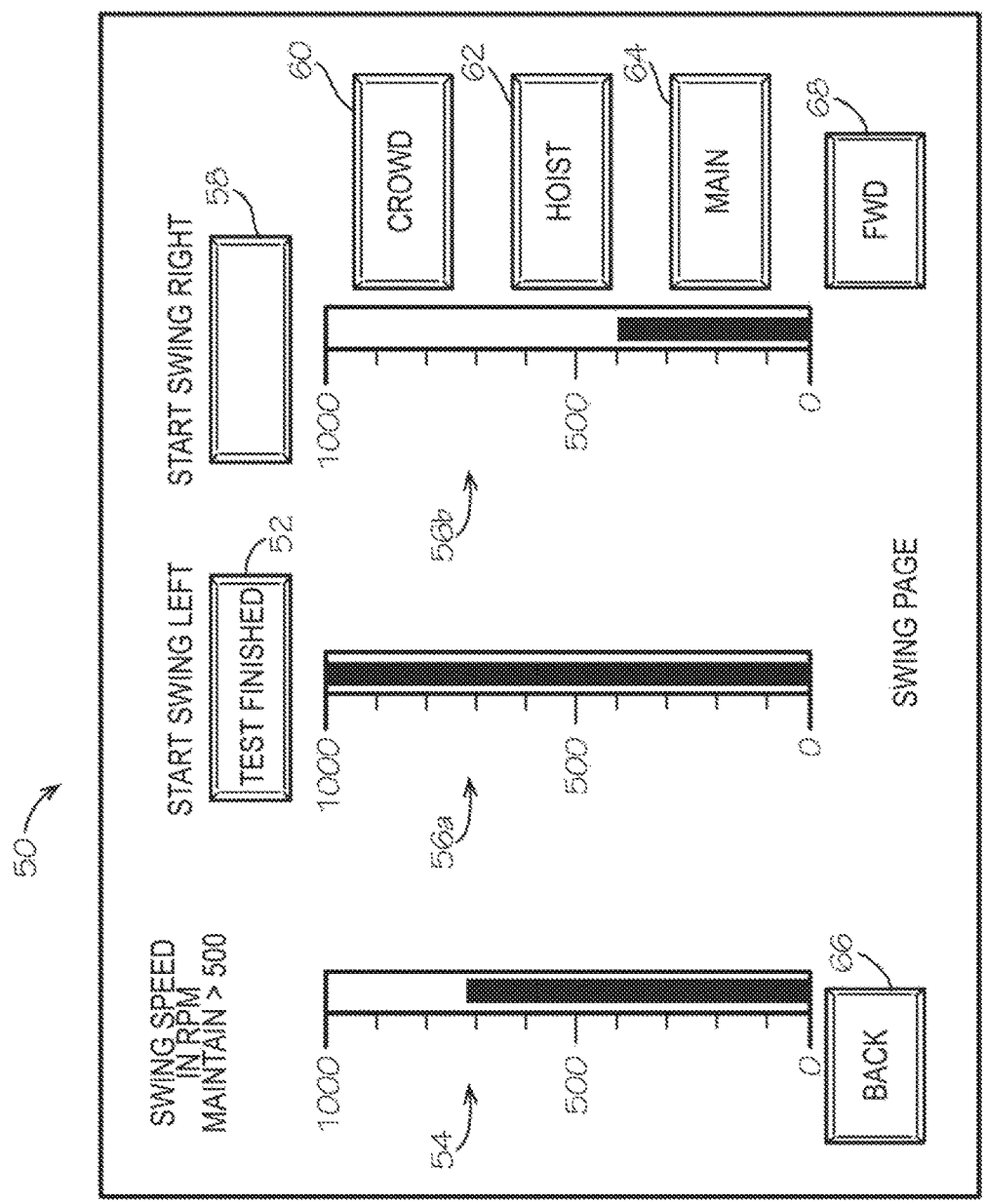
FIG. 4 depicts an exemplary control screen of an operator interface of an apparatus for monitoring the health of articulating machinery according to a preferred embodiment.

A preferred embodiment of an apparatus for monitoring health of articulating machinery is depicted in FIG. 1. The apparatus includes multiple sensors 12 attached at various measurement points on various components of an articulating machine. In one exemplary embodiment, the sensors 12 may up to fifty-four single-axis accelerometers mounted on planetary gearboxes, intermediate gearboxes, electric motors, bearings, and other components of a mining shovel 18, such as depicted in FIG. 2. Data output from the sensors 12 are provided to a programmable logic controller (PLC) 14, which is generally a digital control system having memory 15 and a processor 17. The PLC 14 continuously monitors the data from the sensors 12 and makes decisions based on a custom program to control operation of a machinery monitoring system 16. As described in more detail hereinafter, the PLC 14 receives the data from the sensors 12 and outputs a data signal (DS) and a trigger signal (TS) for each sensor 12. The PLC 14 also outputs a Stage Test start signal (ST), the purpose of which is described hereinafter. The data, trigger, and Stage Test start signals are provided to the appropriate inputs of the machinery monitoring system 16. In one preferred embodiment, the machinery monitoring system 16 is a CSI Model 6500 online machinery monitoring system, which includes a processor 19 and memory 21. The system also includes an operator interface 20, such as a touchscreen, on which progress bars indicate the progression toward a complete analysis profile during testing (FIG. 4).

Figure 3:
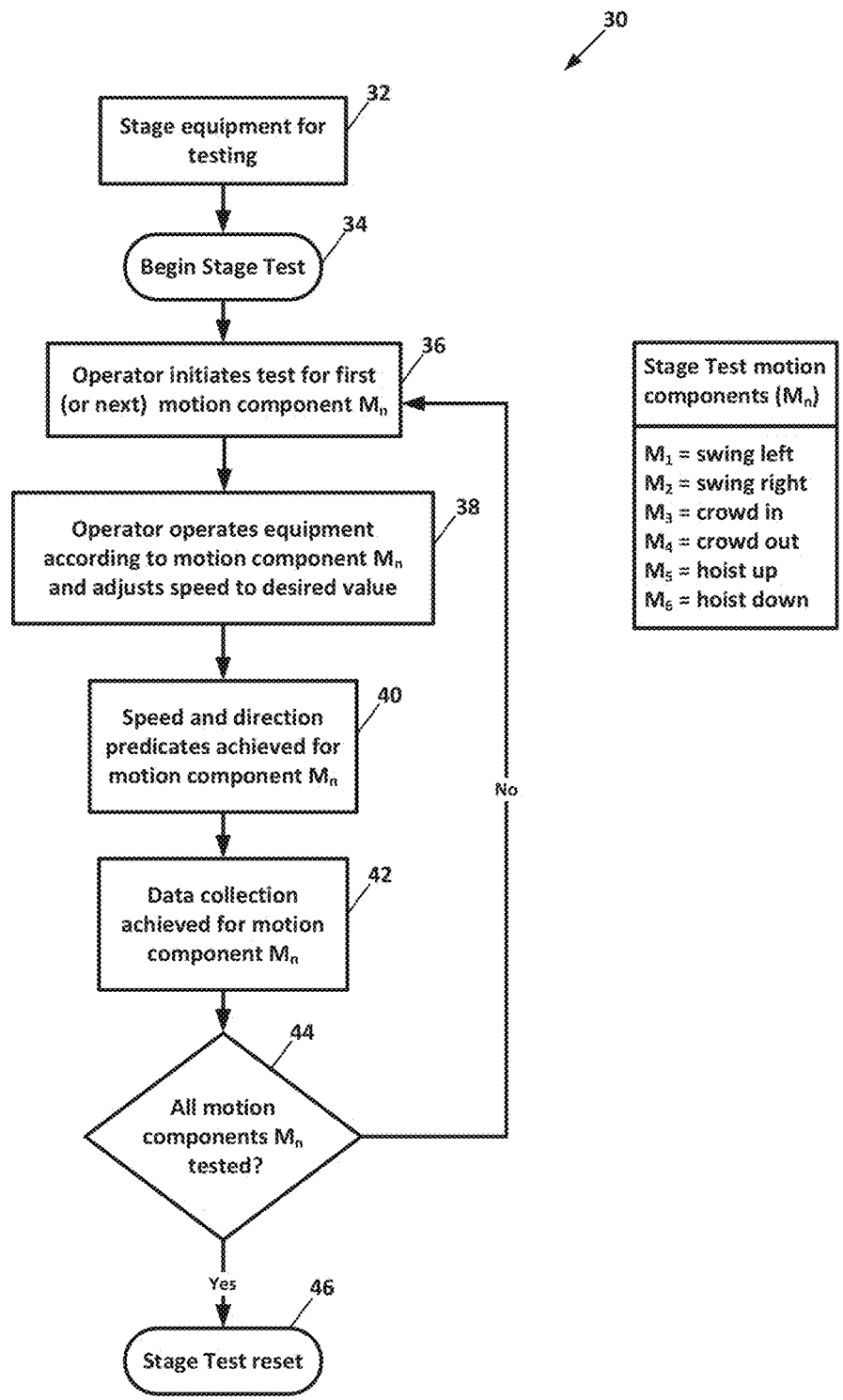
FIG. 3 depicts a flow chart of a method for monitoring the health of articulating machinery according to a preferred embodiment.

FIG. 3 depicts steps performed in a preferred embodiment of a Stage Test 30, which involves collecting sensor data using the machinery monitoring system 16 and associated sensors 12 while moving the shovel 18 in a predetermined set of prescribed motions $M_n$ with an empty bucket, such as swing left ($M_1$), swing right ($M_2$), crowd in ($M_3$), crowd out ($M_4$), hoist up ($M_5$), and hoist down ($M_6$) movements. This test may be performed during a time when the mining shovel 18 is out of service, such as during a relief break, a break between shifts, or even an extended break between arrival of trucks to fill with ore. The Stage Test 30 provides a procedure for the operator to follow to achieve repeatable conditions and movements (e.g., empty the bucket, swing the bucket to an extreme position, stop, and begin a controlled motion) during which a data collection session is triggered by a particular predefined condition of the machine under test, such as a particular position, speed, angle or other trigger event intended to produce highly repeatable, trendable and meaningful data.

To begin the Stage Test, the shovel and its bucket are positioned in a start position (step 32), the operator presses a start test button on the operator interface 20 (step 34). This causes the PLC 14 to output the start test signal (ST) to the machinery monitoring system 16 and activate Modbus communications between the PLC 14 and the machinery monitoring system 16. At this point, the operator interface 20 displays a control screen 50 such as depicted in FIG. 4. To begin the Stage Test for the first prescribed motion $M_1$, the operator presses the "start swing left" button 52 on the control screen 50. Among other things, this activates the PLC 14 to begin monitoring the outputs of one or more of the sensors 12 to determine the speed and direction of the shovel boom as it executes the prescribed motion $M_1$ (a swing to the left). As the operator uses the shovel controls to swing the boom to the left, the swing speed is displayed on a bar graph 54 of the control screen 50 (step 38). For this test, the operator interface 20 prompts the operator to maintain the swing speed at a constant value greater than 500. In a preferred embodiment, when the minimum desired speed is obtained, the background of the bar graph 54 turns green.

In a preferred embodiment, predicates have been set up in the PLC 14 to generate the trigger signal TS to cause the machinery monitoring system 16 to begin a finite predefined data collection segment when the desired speed and a direction of movement for each particular prescribed motion $M_n$ are achieved (step 40). Data is then collected for the prescribed motion $M_1$ from each sensor 12 at each measurement point on the machine. As data is collected, a time stamp associated with an analysis parameter set for each measurement point is updated. The analysis parameter sets preferably contain the criteria for acquiring data at each measurement point along with the analysis parameters to be calculated for each measurement point. The PLC 14 compares the updated time stamps to initial time stamps that were stored at the beginning of the test for the prescribed motion $M_1$. As each measurement point's time stamp is updated from its initial value at the beginning of the test, the PLC 14 calculates the completion percentage of the test, and this percentage is displayed in bar graph form as shown in FIG. 4. Once the test is completed, the text associated with the button 52 that was used to start the test changes to "TEST FINISHED" and the perimeter of the bar graph turns green to indicate completion of the test for prescribed motion $M_1$ (step 42). In the example depicted in FIG. 4, the Swing Left test is 100% complete and the Swing Right test is about 40% complete.

During the course of the Stage Test, the operator uses the operator interface 20 to move to other control screens to gather data for the other prescribed motions $M_2$-$M_6$ for which data has not yet been collected (steps 44 and 36). As shown in FIG. 4, the other control screens may be accessed using the control button 60 (to access crowd in and crowd out), control button 62 (to access hoist up and hoist down), control button 64 (to access the main screen), and control buttons 66 and 68 to move back or forward between screens. The data collections for the various prescribed motions $M_n$ may all be performed one after the other, or each individually as break time allows.

When data collection is complete for all of the prescribed motions $M_n$, the Stage Test is reset, either manually by the operator using the operator interface 20 or automatically after 20 minutes of system inactivity (step 46). The Stage Test reset returns each prescribed motion test to its initial "pre-test start" state, and the component test is ready for the next test sequence.

Although the above procedure describes performance of the Stage Test during a break time, for verification purposes the Stage Test should also be performed anytime a potential issue is found based on data acquired during normal production operation.

Because only a sub-segment of data is sometimes collectable during a single prescribed motion $M_n$, it is often necessary to define a predicate intended to initiate a series of measurements using the monitoring system 16. It may take many cycles to collect sufficient data for a movement having a particular set of conditions, such as a hoist down movement between speed A and speed B while a shovel is moving in a specified direction with a specified range for hoist, swing or crowd.

Data may also be acquired during normal shovel operation using the system 10 depicted in FIG. 1. As described above, as the shovel is in use, the PLC 14 decodes signals from the sensors 12 to obtain speed and direction of various shovel components. The PLC 14 provides a trigger signal to the machinery monitoring system 16 when the speed and direction of a particular shovel component is satisfactory for data collection. As described above, predicates stored in the memory 15 of the PLC 14 are used to generate the trigger signals to begin a finite predefined data collection segment. When data is collected, the time stamp for each point's analysis parameter set is updated and will not be collected again until an incremental timer has expired, all of the other system points have been acquired, and the system parameters of speed and direction are again met. The PLC 14 compares the updated time stamp to the initial time stamp that was stored at last data acquisition to determine whether data has been collected over a sufficient period of time. As described above, progress of the data acquisition may be displayed on the various control screens 50 of the operator interface 20.

In one preferred embodiment, the sensors 12 include current sensors attached to the various electric motors in the shovel. Because motor current is an indication of system loading, the current draw from at least one motor in each shovel system is monitored and included with speed and direction to determine the optimum operational condition at which to acquire machinery health data. The PLC 14 of this embodiment is programmed to provide the trigger signal to the machinery monitoring system 16 when the system load, as well as the speed and direction are satisfactory for data collection during normal shovel operation.

In some embodiments, the sensors 12 include sensors for monitoring the condition or structural integrity of the boom, dipper handles, critical gentry locations, boom cables, and other structural components. FIG. 2 indicates possible locations for placement of such sensors. Sensors for monitoring structural integrity include but are not limited to strain gauges that can transmit wirelessly via the WirelessHart protocol or other wireless protocols to a WirelessHart gateway. In some embodiments, the WirelessHart gateway transfers the strain gauge data to a database that is accessible by the machinery health condition monitoring system 10.

In some embodiments of the system 10, the sensors 12 include sensors for monitoring the condition of cooling fans on the swing drives and hoist drives of the shovel and to integrate the cooling fan condition data into a common condition database. Such fans are constant-speed and constant-load assets that be monitored with an inexpensive wireless transmitter, such as a CSI model 9420.

Preferred embodiments of the system 10 collect a normal vibration waveform and spectrum, as well as a PeakVue™ stress wave analysis waveform and spectrum for the multiple sensors 12. PeakVue™ analysis is described in U.S. Pat. Nos. 5,633,811 and 5,895,857, the entire contents of which are incorporated herein in its entirety by reference.

In preferred embodiments, feature-rich information is typically presented in the form of a measurand, which is also referred to herein as a parameter. A measurand is usually a scalar value, an array set, a vector, or other type of valuation. Measurands are preferably identified with a recognizable title such as "misfire" or "imbalance" or "timing fault" or other distinguishable reference.

In some embodiments, the machinery monitoring system 16 trends measurands for diagnosis using absolute value and rate-of-change alarming. In these embodiments, the machinery monitoring system 16 may be a single stand-alone computer or it may comprise a complex arrangement of several database servers and client computers linked by a local area network. Statistical limits are sometimes used based on either statistical process control (SPC), cumulative distribution, or other statistical probability density type of alarming. For example, some embodiments calculate a mean, a median, a minimum, and a maximum value for a population of data produced by the machinery monitoring system 16. Such a population is typically a similar grouping of measurand values, usually collected in similar manner under similar conditions from machinery operating under repeatable speed, load, and direction. When a median value of such populations is approximately equivalent to an average value for the population, there is strong indication that the population is likely a Gaussian normal distribution. This indicates that such measurements are in a normal range, such that either cumulative distribution techniques or SPC techniques should be appropriate. In this case, SPC interpretations based on multiples of standard deviation are relevant and appropriate for programmatic or human interpretation of data within such a population.

However, in a situation where causal data is present in the population due to a root or a mechanism prompting a plurality of relatively high or relatively low measurand outputs, application of a conventional SPC interpretation is not appropriate. In such a situation, cumulative distribution analysis should be applied, such as using the Autostat™ software routine by Computational Systems, Inc. The Autostat™ routine, which runs within AMS Suite: Machinery Health™ Manager software (by Computational Systems, Inc.), statistically analyzes selected populations for a given analysis parameter, such as a Peak-to-Peak, a Maximum Peak, or another analysis parameter. A selected population is typically based on similar equipment under similar operating conditions. The Autostat™ routine's statistical analysis typically involves creation of a probability density function (PDF) and a cumulative distribution function (CDF) as well as other common statistics such as mean and standard deviation.

The PDF and CDF allow machine logic or a person to determine with certainty threshold values such as alert levels or alarm levels based on percentages of a measurand data population. Of particular value to embodiments described herein is the ability of a CDF to determine measurand values corresponding to a desired alert or alarm level, such as one or more of the following population percentiles: 1%, 3%, 6%, 10%, 50% (median), 90%, 94%, 97%, and 99%. The PDF and CDF approaches typically work well for most dataset populations including Gaussian normal type as well as skewed populations containing causal (root cause) data. Alternatively, one may prefer to estimate threshold percentiles by adding a multiple of standard deviation (sigma) to a mean value or by subtracting the multiple of sigma from the mean value. Mean value plus and minus multiples of sigma is commonly used with statistical process control (SPC), which is usually applied when measurand data populations are Gaussian normal.

One or multiple of these techniques may be used in accordance with embodiments described herein to accommodate the manual or automatic setting or adjusting of limits for low alert, high alert, low fault, and high fault limits. For example, one may use mean plus 2×sigma for an alert level, and mean plus 3×sigma for an alarm level when SPC is accepted and preferred. When CDF is preferred, it is potentially better and more direct to use the $97^{th}$ percentile for an alert level and the $99^{th}$ percentile for an alarm level. Preferred embodiments provide an alert that SPC is not appropriate and cumulative distribution is appropriate when a median value is significantly different from a mean value for a data population. Often in such cases, the median value is very much smaller than the mean value. This is due to the fact that, for many measurands in this measurement system, zero is the lowest value, and out-of-control measurements such as causal measurements tend to produce very high value outputs. Thus, a few very high numbers tend to drive up the mean of a population while leaving the median value relatively unaffected.

An indication of causal data within a population is a meaningful output of some embodiments, because this alerts an operator or a programmed logic system that something is beyond statistical norms and further interrogation is justified.

Cumulative distribution techniques, such as those provided by the Autostat™ routine, assist the programmed logic or human operator to identify threshold levels below which 99% or 90% of data are contained, and above which 1% or 10% respectively of the data are exceeding. Measurands exceeding statistical ranges like cumulative distribution, SPC, or other similar techniques may suggest ranges of interest, and provide flags to set warning levels, such as a high fault, low fault, high alert, or a low alert.

Movements for articulating mechanisms typically follow a frequently repeating pattern during their normal duty cycle. During at least some of those movements, it may be reasonable to collect meaningful data that may be trended if conditions during data collection are found to be similar. For example, in a normal duty cycle an operator may consistently move an empty bucket the same way over and over. This may be an acceptable interval for collecting data while the bucket is not loaded and while the motion is relatively consistent in speed and direction. Due to all the translation, rotation, acceleration, deceleration and direction changes that occur in typical operation of articulating mechanical components, it may take several repeat movements to accumulate enough data to be sufficient for a single measurement.

Figure 5A:
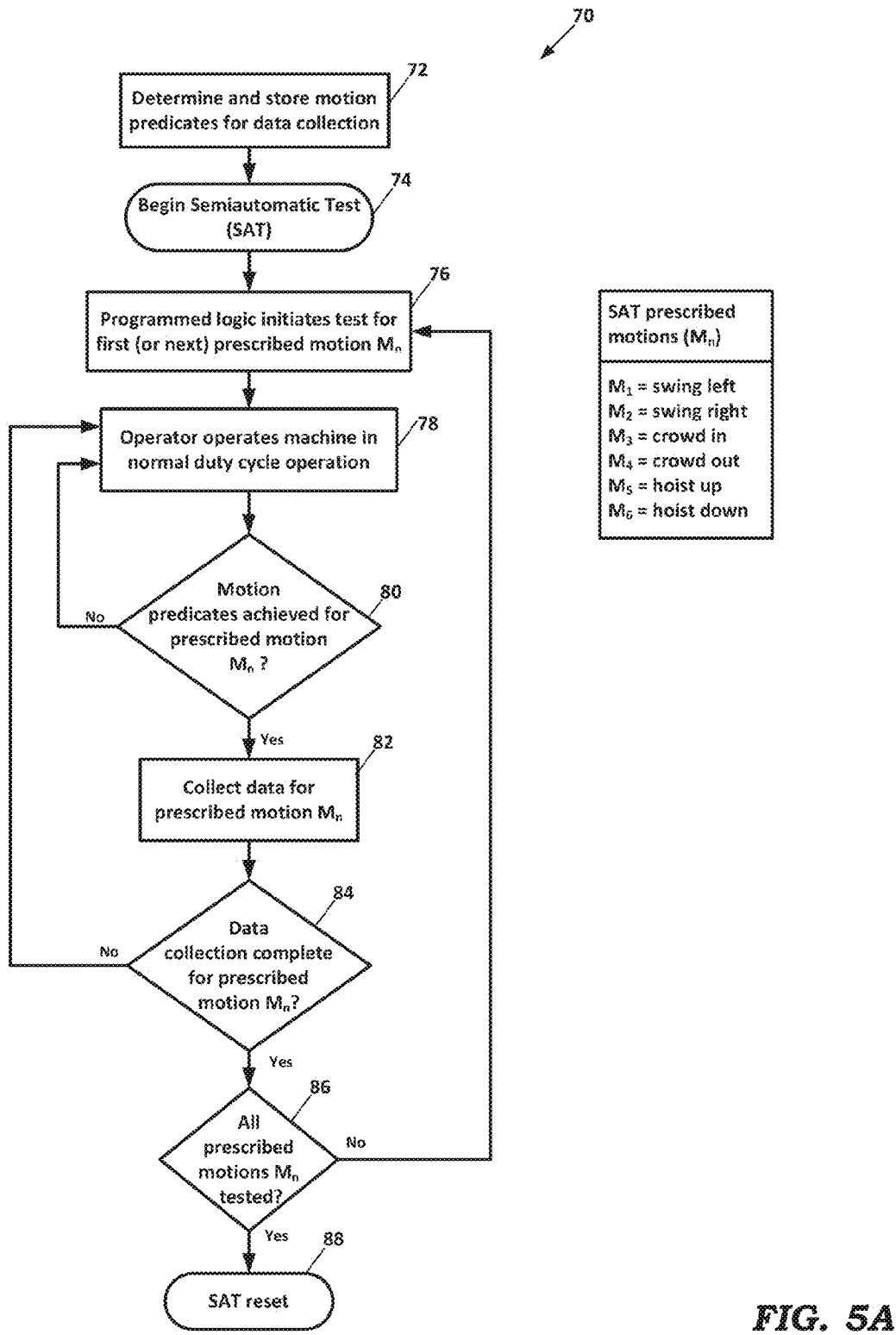
FIGS. 5A and 5B depict flow charts of a methods for monitoring the health of articulating machinery according to alternative embodiments.
Figure 5B:
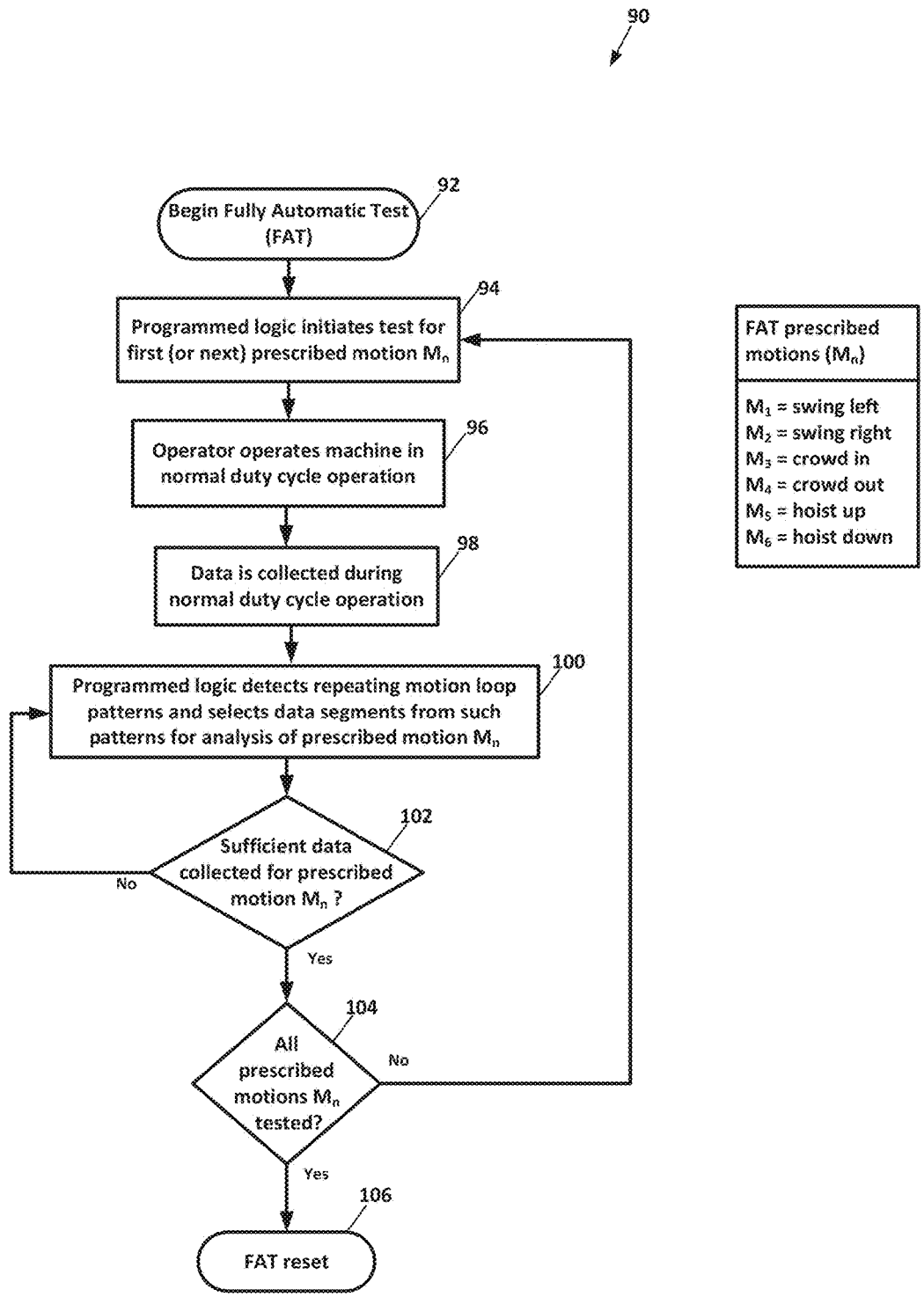

Some embodiments of the invention implement Semi-Automatic Test (SAT) or Fully-Automatic Test (FAT) data collection and data analysis techniques. SAT and FAT data collections are accomplished based on a somewhat different rationale than the Stage Test depicted in FIG. 3. FIGS. 5A and 5B depict examples of SAT and FAT real-time duty cycle segment testing for collecting meaningful data, such as data having a good signal-to-noise ratio, under repeatable conditions, such as repeatable load, speed, and direction. With SAT and FAT, the machine operator may go about normal, every-day, operation and allow the monitoring system to collect data all the time or whenever it is convenient. This data is then parsed out into meaningful segments that may be associated as if they were collected continuously while an operator is performing a carefully controlled articulating movement.

In an SAT data collection and analysis embodiment, steps in a routine operation are identified wherein a sensor signal is likely to be free of background noise or other undesirable interference so that data derived from the sensor signal are likely to be rich with useful information about the health of machine components. It is desirable to avoid times when overwhelming noise or other out-of-control or environmental inputs overwhelm a meaningful signal, such as when a shovel is digging in rocks or dumping a load. For example, an operator or test designer may determine that a desirable condition to collect data is when a load indication shows the shovel bucket is empty and the shovel motion is "crowd out" ($M_4$). Thus, the SAT mode implements data collection while certain conditions and limitations are met that were selected by the machine operator or test designer. For example, when certain measurable conditions exist but other certain measurable conditions do not exist, then a start trigger signal ($TS_1$) begins data collection that continues until the certain conditions are no longer met, at which time a stop trigger signal ($TS_2$) ends data collection. Multiple such data segments are accumulated and statistically stitched together to produce a data set that is sufficiently large for meaningful analysis. In this way, the SAT technique avoids a situation in which the machine operator must take the machine off-line to collect data while the machine is not in production.

With reference to FIG. 5A, before beginning an SAT data collection 70, motion predicates are determined and stored in the memory 15 of the PLC 14 for each of the prescribed motions $M_N$ (step 72). As discussed above, these motion predicates may be determined and entered by the machine operator or test designer. Upon beginning the SAT (step 74), the processor 17 of the PLC 14 initiates a first portion of the test to collect data for a first prescribed motion $M_N$, such as motion $M_1$ (swing left) (step 76). While the machine is operated in normal duty cycles as it performs its work (step 78), the processor 17 of the PLC 14 monitors the data collected by the sensors 12 to determine whether the motion predicates for the prescribed motion $M_1$ are being achieved (step 80). While the motion predicates are being achieved, data is collected for the prescribed motion $M_1$ (step 82). Once a sufficient number of data segments have been collected for the first prescribed motion $M_1$ (step 84), the process loops back (step 86) to begin collecting data for the second prescribed motion $M_2$ (step 76). This process continues until a sufficient number of data segments have been collected for all of the prescribed motions $M_N$, at which point the SAT resets (step 88). As with the Stage Test, the PLC 14 calculates the completion percentage of the data collection for each prescribed motion, and this percentage may be displayed for the operator, such as in bar graph form as shown in FIG. 4.

The FAT data collection process makes use of the highly repetitive nature of articulating machinery in when such machinery is in normal use. The FAT process detects, marks off, interprets, recognizes, and triggers data collection to occur during portions of a duty cycle in which consistent, trendable data may be collected. In normal operation, an articulating machine returns to a starting point over and over and over again. During an FAT data collection process, the monitoring system automatically creates loops of data beginning at a motion starting point and ending with a return to the starting point. Because articulating machinery the movements are commonly bi-directional with no out-of-line movements, it is relatively easy to select just a few common duty cycle loop patterns for the basis of analysis. During operation of articulating machines, there are many possibilities for repetitive motions, depending on the machine operator choices for movements and work performed by the machine. These repetitive motions are opportunities for FAT data collection. In a preferred embodiment, programmed logic running in the processor 17 of the PLC 14 (1) identifies the loops and identifies portions of the loops in which meaningful, trendable and repeatable data may be collected, (2) discerns when unwanted noise is absent, such as when the bucket is not under load, (3) discerns when a start trigger event occurs to begin data collection, (4) qualifies the collected data as acceptable before storing it for further analysis, and (5) stitches or averages or otherwise combines data segments into meaningful analysis parameters, such as scalar values, waveforms, arrays, or other associated data sets.

With reference to FIG. 5B, upon beginning a preferred embodiment of the FAT process (step 92), the processor 17 of the PLC 14 initiates a first portion of the test to collect data for a first prescribed motion $M_N$, such as motion $M_1$ (swing left) (step 94). As the machine is operated in normal duty cycles while performing its work (step 96), data is collected by the sensors 12 (step 98). Based on the sensor data, the processor 17 detects patterns of repeating machine motions that include the prescribed motion $M_1$, and the processor 17 selects segments of the data collected during those repeating motions (step 100). Once a sufficient number of data segments have been collected to fully analyze the first prescribed motion $M_1$ (step 102), the process loops back (step 104) to begin collecting data for the second prescribed motion $M_2$ (step 94). This process continues until a sufficient number of data segments have been collected for all of the prescribed motions $M_N$, at which point the FAT resets (step 106). As with the Stage Test and SAT, the PLC 14 calculates the completion percentage of the data collection for each prescribed motion, and this percentage may be displayed for the operator, such as in bar graph form as shown in FIG. 4.

In preferred embodiments, the data analysis performed on data sets collected using the SAT and FAT techniques typically apply CDF, PDF, and SPC as appropriate to automatically determine and adjust alert and alarm limits based on estimated or actual population percentiles. For example, data between 3% and 97% may be considered normal, data between 1% and 3% and between 97% and 99% considered worthy of an alert indication, and data below 1% and above 99% considered worthy of an alarm indication.

Embodiments described herein collect data for analyzing motion of articulating components in machinery that reaches, lifts, and twists with many degrees of freedom. This differs from most reciprocating machine components that commonly have a piston or other mechanism translating along a linear motion, typically in connection with a crank shaft mechanism that is linked to operations of such components as intake and exhaust valves. The close association of reciprocating component movements with a crank shaft angle allows monitoring systems for such components to encode shaft angles and synchronize sensor measurements as a function of crankshaft angle. In contrast, articulating machinery does not have this simple association, where everything in motion is related to a single component such as shaft angle, which may be measured with a single encoder. In the absence of such an encoder signal, embodiments described herein track critical component movements by using either the Stage Testing, SAT, or FAT techniques. While techniques commonly used in the art for monitoring reciprocating machines may not be suitable for direct application to articulating machinery, it is anticipated that embodiments described herein may be applied to reciprocating machinery.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for acquiring repeatable and trendable performance data for monitoring the health of an articulating machine, the method comprising:
   (a) storing one or more motion predicate values in memory of a programmable logic controller that is configured to receive the performance data from a plurality of sensors attached to a plurality of components of the machine, each of the one or more motion predicate values indicating a desired speed and direction of movement to be achieved as a predicate to analysis of performance data as the machine performs one or more prescribed motions;
   (b) operating the machine to execute the one or more prescribed motions in performance of work;
   (c) while performing step (b), the programmable logic controller collecting the performance data from the plurality of sensors attached to the plurality of components of the machine;
   (d) a processor of the programmable logic controller determining whether one or more motion conditions are being achieved for a particular one of the one or more prescribed motions based on comparing the performance data to the one or more motion predicate values;
   (e) a processor of a machinery monitoring system calculating one or more analysis parameter values that are indicative of the health of the machine using performance data collected while the one or more motion conditions are being achieved for the particular prescribed motion; and repeating one or more of steps (b) through (e) until the processor of the machinery monitoring system has calculated analysis parameter values for the one or more prescribed motions.

2. The method of claim 1 further comprising:

a display device prompting an operator to operate the machine to perform a particular one of the one or more prescribed motions;

step (d) including the processor of the programmable logic controller determining whether one or more motion conditions are being achieved for the particular prescribed motion prompted for the operator; and step (f) including repeating the prompting of the operator and steps (b) through (e) until the processor of the machinery monitoring system has calculated analysis parameter values for the one or more prescribed motions.

3. The method of claim 1 wherein:

step (a) includes storing a speed predicate value and a direction predicate value for the one or more prescribed motions in memory of the programmable logic controller;

step (d) includes the processor of the programmable logic controller determining that the component of the machine is moving in a direction indicated by the direction predicate value for the particular prescribed motion and at or above a speed indicated by the speed predicate value for the particular prescribed motion; and step (e) includes the processor of the machinery monitoring system using performance data collected while the component of the machine is moving in the direction indicated by the direction predicate value and at or above the speed indicated by the speed predicate value to calculate the one or more analysis parameter values.

4. The method of claim 3 wherein:

step (a) includes storing a motor current predicate value for the one or more prescribed motions in memory of the programmable logic controller;

step (d) includes the processor of the programmable logic controller determining that a motor current level is at or above a level indicated by the motor current predicate value; and step (e) includes the processor of the machinery monitoring system using performance data collected while the component of the machine is moving in the direction indicated by the direction predicate value and at or above the speed indicated by the speed predicate value and at or above the motor current level indicated by the motor current predicate value to calculate the one or more analysis parameter values.

5. The method of claim 3 wherein the articulating machine is a mining shovel having a bucket, and wherein step (a) includes storing one or more speed predicate values and one or more direction predicate values in memory of the programmable logic controller for prescribed bucket motions including one or more of a swing bucket left motion, a swing bucket right motion, a crowd bucket in motion, a crowd bucket out motion, a hoist bucket up motion, and a hoist bucket down motion.

6. The method of claim 1 wherein:

step (c) comprises the processor of the programmable logic controller inserting timestamp information into the performance data;

step (d) comprises, based on the timestamp information, the processor of the programmable logic controller determining time durations of one or more data segments during which the one or more motion conditions are being achieved;

step (e) comprises the processor of the machinery monitoring system determining whether a sum of the time durations of the one or more data segments is greater than or equal to a desired total time duration for performance data collection for the particular prescribed motion; and step (f) comprises repeating steps (b) through (e) until the processor of the machinery monitoring system determines that the sum of the time durations of the one or more data segments is greater than or equal to the desired total time duration for performance data collection for the particular prescribed motion.

7. The method of claim 6 further comprising displaying to an operator an indication of progress of completion of data collection for the particular prescribed motion based on comparison of the desired total time duration to the sum of the time durations of the one or more data segments.

8. The method of claim 1 wherein step (c) comprises the processor of the programmable logic controller collecting the performance data from sensors selected from the group consisting of vibration sensors, current sensors, strain sensors, temperature sensors and pressure sensors.

9. The method of claim 1 wherein step (e) comprises the processor of the machinery monitoring system calculating one or more analysis parameter values that comprise one or more scalar values, vectors, or array sets.

10. The method of claim 9 wherein the one or more analysis parameter values are identified as a misfire, an imbalance, or a timing fault.

11. An apparatus for acquiring repeatable and trendable performance data for monitoring the health of an articulating machine, the apparatus comprising:

a plurality of sensors attached to a plurality of components of the machine, the plurality of sensors for collecting performance data as the machine performs one or more prescribed motions, wherein the performance data includes timestamp information;

a programmable logic controller configured to receive the performance data from the plurality of sensors, the programmable logic controller comprising:

memory for storing one or more motion predicate values, each indicating a motion condition to be achieved as a predicate to analysis of performance data as the machine performs the one or more prescribed motions; and a processor for:

determining, based on comparing the performance data to the one or more motion predicate values, whether one or more motion conditions are being achieved as the machine performs the one or more prescribed motions, determining time durations of one or more data segments during which the one or more motion conditions are being achieved based on the timestamp information, and determining whether a sum of the time durations of the one or more data segments is greater than or equal to a desired total time duration for performance data collection for the one or more prescribed motions; and a machinery monitoring system having a processor for calculating one or more analysis parameter values that are indicative of the health of the machine using performance data collected while the one or more motion conditions are being achieved, the processor calculating the one or more analysis parameter values if the sum of the time durations of the one or more data segments is greater than or equal to the desired total time duration for performance data collection for the one or more prescribed motions.

12. The apparatus of claim 11 further comprising a display device for displaying prompts to an operator to operate the machine to perform each of the one or more prescribed motions until data has been collected for the one or more prescribed motions.

13. The apparatus of claim 11 wherein:
the memory of the programmable logic controller stores a speed predicate value and a direction predicate value for the one or more prescribed motions;
the processor of the programmable logic controller is programmed to determine that one or more components of the machine are moving in a direction indicated by the direction predicate value for a particular prescribed motion and at or above a speed indicated by the speed predicate value for the particular prescribed motion; and
the processor of the machinery monitoring system calculates the one or more analysis parameter values using performance data collected while the one or more components of the machine are moving in the direction indicated by the direction predicate value and at or above the speed indicated by the speed predicate value.

14. The apparatus of claim 13 wherein:
the memory of the programmable logic controller stores a motor current predicate value for the one or more prescribed motions;
the processor of the programmable logic controller is programmed to determine that a motor current level is at or above a level indicated by the motor current predicate value for the particular prescribed motion; and
the processor of the machinery monitoring system calculates the one or more analysis parameter values using performance data collected while the one or more components of the machine are moving in the direction indicated by the direction predicate value and at or above the speed indicated by the speed predicate value and at or above the motor current level indicated by the motor current predicate value.

15. The apparatus of claim 11 for acquiring repeatable and trendable performance data for monitoring the health of a mining shovel having a bucket, wherein the memory of the programmable logic controller stores one or more speed predicate values and one or more direction predicate values for one or more prescribed motions of the bucket including one or more of a swing bucket left motion, a swing bucket right motion, a crowd bucket in motion, a crowd bucket out motion, a hoist bucket up motion, and a hoist bucket down motion.

16. The apparatus of claim 15 further comprising a display device for prompting the operator to swing the bucket left, swing the bucket right, crowd the bucket in, crowd the bucket out, hoist the bucket up, or hoist the bucket down.

17. The apparatus of claim 16 wherein the display device displays to the operator an indication of progress of completion of data collection for the one or more prescribed motions based on comparison of the desired total time duration to the sum of the time durations of the one or more data segments.

18. The apparatus of claim 11 wherein the plurality of sensors are selected from the group consisting of vibration sensors, current sensors, strain sensors, temperature sensors and pressure sensors.

19. The apparatus of claim 11 wherein the processor of the machinery monitoring system calculates one or more analysis parameter values that comprise one or more scalar values, vectors, or array sets.

20. The apparatus of claim 11 wherein the programmable logic controller outputs a trigger signal to the processor of the machinery monitoring system based on the one or more motion conditions being achieved as the machine performs the one or more prescribed motions.

21. The apparatus of claim 20 wherein the programmable logic controller outputs the trigger signal based on component load, speed, and direction motion conditions being achieved.

22. A method for acquiring repeatable and trendable performance data for monitoring the health of an articulating machine that performs one or more prescribed motions while performing work, the method comprising:
(a) operating the machine to execute the one or more prescribed motions in performance of work;
(b) a programmable logic controller collecting performance data from a plurality of sensors attached to a plurality of components of the machine as the machine is operated to perform work;
(c) a processor of the programmable logic controller determining, based on the performance data, that the machine is performing a prescribed motion that repeats during operation of the machine;
(d) the processor of the programmable logic controller selecting segments of the performance data that were collected while the machine was performing the prescribed motion that repeats during operation of the machine;
(e) the processor of the programmable logic controller determining that a sufficient number of segments of the performance data have been selected to calculate one or more analysis parameter values that are indicative of the health of the machine;
(f) a processor of the machinery monitoring system calculating the one or more analysis parameter values when a sufficient number of segments have been selected; and
(g) repeating one or more of steps (a) through (f) until the processor of the machinery monitoring system has calculated analysis parameter values for the one or more prescribed motions.

23. The method of claim 22 further comprising the processor of the machinery monitoring system detecting and trending machinery faults based on the selected segments of performance data, including faults selected from the group consisting of:
rolling element bearing faults including one or more of an inner race defect, an outer race defect, a roller element defect, a cage defect, and race slipping;
planetary gear defects and rack-and-pinion gear defects including one or more of crack formation and propagation, broken teeth, tooth fatigue, abrasion, gear misalignment;

shaft coupling misalignment;
a mechanical imbalance of a rotor;
a phase imbalance of a motor rotor or stator;
a phase imbalance of a generator rotor or stator;
a motor rotor or motor stator problem including one or more of a broken rotor bar, an eccentricity;
a mechanical looseness allowing excessive play or movement;
a soft foot or other foundation problem; and
blade or vane defects in a pump.

24. The method of claim 22 wherein step (d) comprises the processor of the programmable logic controller selecting segments of the performance data that were collected while the machine is operating under conditions of repeatable load, speed, and direction.

25. The method of claim 22 further comprising applying one or more of a probability density function, a cumulative distribution function, and statistical process control to the selected data segments to determine alert limits and alarm limits.

26. The apparatus of claim 11 wherein the timestamp information is inserted into the performance data by one or more of the plurality of sensors or by the processor of the programmable logic controller.

* * * * *